United States Patent [19]

Towne

[11] 4,028,569
[45] June 7, 1977

[54] VENTILATION SYSTEM FOR DYNAMOELECTRIC MACHINES

[75] Inventor: Raymond A. Towne, Penn Hills, Pa.

[73] Assignee: Westinghouse Electric Corporation, Pittsburgh, Pa.

[22] Filed: June 16, 1975

[21] Appl. No.: 587,766

[52] U.S. Cl. .................................. 310/64; 310/269
[51] Int. Cl.² ........................................... H02K 3/24
[58] Field of Search ............... 310/58, 54, 53, 55, 310/52, 57, 61, 64, 65, 157, 269, 59

[56] References Cited

UNITED STATES PATENTS

| | | | |
|---|---|---|---|
| 1,702,448 | 2/1929 | McCarty | 310/64 |
| 2,502,669 | 4/1950 | Pollard | 310/58 |
| 2,917,644 | 12/1959 | Laffoon | 310/64 |
| 2,994,793 | 8/1961 | Sills | 310/269 |
| 3,116,429 | 12/1963 | Harrington | 310/64 |
| 3,160,770 | 12/1964 | Asantcheeff | 310/157 |
| 3,188,833 | 6/1965 | Robinson | 310/54 |
| 3,588,557 | 6/1971 | Kilgore | 310/269 |
| 3,597,645 | 8/1971 | Duffert | 310/54 |

Primary Examiner—R. Skudy
Attorney, Agent, or Firm—G. H. Telfer

[57] ABSTRACT

A ventilation system is provided for dynamoelectric machines such as hydro generators having salient pole rotors and in which the rotor and stator have separate ventilation systems sealed from the air gap. The stator ventilation system includes radial vent ducts in the stator core with longitudinal ducts extending between adjacent radial vent ducts in the tops of the winding slots. The longitudinal ducts are formed by two radially spaced wedges in each slot defining an axial passage between them, and the ducts are sealed from the air gap by the wedges and by sealing members at the inner ends of the radial ducts. Ventilating air flows radially inward through the vent ducts, longitudinally through the longitudinal ducts from one vent duct to the next, and radially outward to the external circuit where it is circulated through coolers by means of a blower or otherwise.

7 Claims, 6 Drawing Figures

VENTILATION SYSTEM FOR DYNAMOELECTRIC MACHINES

BACKGROUND OF THE INVENTION

The present invention relates to a ventilation system for dynamoelectric machines, and more particularly to cooling the stators of large machines such as hydro generators.

Hydro or waterwheel generators are vertical machines of large physical size with salient pole rotors, and rotate at relatively low speeds as compared to other types of generators although the peripheral speed of the rotor may be quite high because of the large diameter. These machines are cooled by circulation of air and two types of cooling systems have conventionally been used. In one system, the air is circulated by a blower, which may be mounted on the rotor, and is directed to flow axially through the spaces between the salient poles of the rotor. The air flows axially in the interpolar spaces to cool the field windings and poles and then flows radially into the air gap and across the air gap to the stator. The stator core has radial vent ducts extending through it and the cooling air crossing the air gap flows through these ducts to cool the stator windings and core, and is discharged at the back or outer periphery of the core and recirculated after flowing through the coolers. The other cooling system, which has come into use more recently, uses the rotor spider and rim as a blower to cause the air to flow radially through ducts in the rotor rim and thus into the interpolar spaces from which it flows radially across the air gap and through the stator core radial vent ducts as described above. In both of these schemes, therefore, the air rotates with the rotor as it flows into and across the air gap. Furthermore, the same air flows in series through the rotor and the stator core, and the volume of air must be adequate to cool both rotor and stator sufficiently to keep the temperature rise within the required limits. Thus, a large volume of air is necessary and the rotation of this large mass of air at or near the peripheral speed of the rotor results in high windage losses.

The present trend in hydro machines, especially in those intended for alternative operation as generators and as motors in pumped storage installations, is to machines of large size and relatively high speed. The combination of large rotor diameter and high speed results in very high peripheral velocities of the rotor which may be in excess of 15,000 feet per minute, for example. With the conventional ventilation schemes discussed above, the windage loss is quite high and becomes a relatively large percentage of the total loss in the machine. A reduction in the windage loss therefore can result in a very substantial reduction in the total losses, with a corresponding increase in efficiency, or a reduction in the size of the machine with a substantial saving in cost.

It has been proposed to greatly reduce the windage loss in machines of this type by separating the rotor and stator air flows into separate ventilation systems and sealing off the rotor air flow from the air gap, as in Kilgore et al. U.S. Pat. No. 3,588,557. This results in a substantial reduction in the windage loss since most of the rotor cooling air is confined to the rotor and prevented from reaching the air gap as only enough air is allowed to flow into the air gap to remove the heat resulting from the pole faces losses. Separation of the rotor and stator air flows also greatly reduces the volume of air required. In the conventional cooling schemes, the stator cooling air flows first through the rotor and then across the air gap so that it is heated by the rotor losses before it reaches the stator. In order to obtain the necessary cooling of the stator, therefore, a relatively large flow of air is required. When the stator air flow is separated from the rotor air flow, however, cold air enters the stator so that the volume of air required for cooling the stator is reduced and the total air flow in the machine is greatly reduced. Since the stator air flow is largely independent of the rotor air flow, and smaller volumes of cooler air can be used for cooling the stator, an opportunity exists for further improvement in cooling by new stator ventilation systems.

In a copending application of A. K. Mishra et al, Ser. No. 587,790, filed July 16, 1975 and assigned to the assignee of the present invention, there is disclosed and claimed an improved stator ventilation system. In this system, cooling air is introduced through the back, or outside, of the stator core and flows inward through radial vent ducts in the core to the region of the teeth and windings. The air then flows axially in longitudinal ducts in the core from one vent duct to the next and then radially outward through the core. Such a cooling system results in a substantial improvement in efficiency of the machine by reducing the pumping power required to circulate the stator cooling air as well as permitting a higher machine rating or smaller size because of the improved cooling.

SUMMARY OF THE INVENTION

The present invention provides a stator ventilation system of the type discussed above in which the longitudinal ducts in the stator core are disposed in the tops of the winding slots.

In the copending application mentioned above, the longitudinal ducts in the stator core were provided by openings or slits in the teeth which formed longitudinal passages extending between the radial vent ducts. In accordance with the present invention, the longitudinal ducts extend through the slots and do not require additional openings in the core punchings. For this purpose, the radial depth of the slots is made greater than is necessary to accommodate the windings and the extra space thus provided at the top of each slot is used for the longitudinal ducts. Two wedges are provided in each slot to define the duct. A first wedge engages the windings and retains them in place in the usual manner and a second wedge is radially spaced from the first wedge to form the duct. The second wedge is close to the air gap and forms a seal with the core to prevent escape of ventilating air. Additional sealing means are also provided at the inner end of each radial vent duct so that the air path is completely sealed from the air gap. In this way, longitudinal ducts are provided in the core which are easily manufactured and are very effective in cooling because of their close proximity to the windings. It has also been found that the pressure drop across these ducts is much lower than that across the ducts of the prior application so that the necessary pumping power is substantially reduced.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
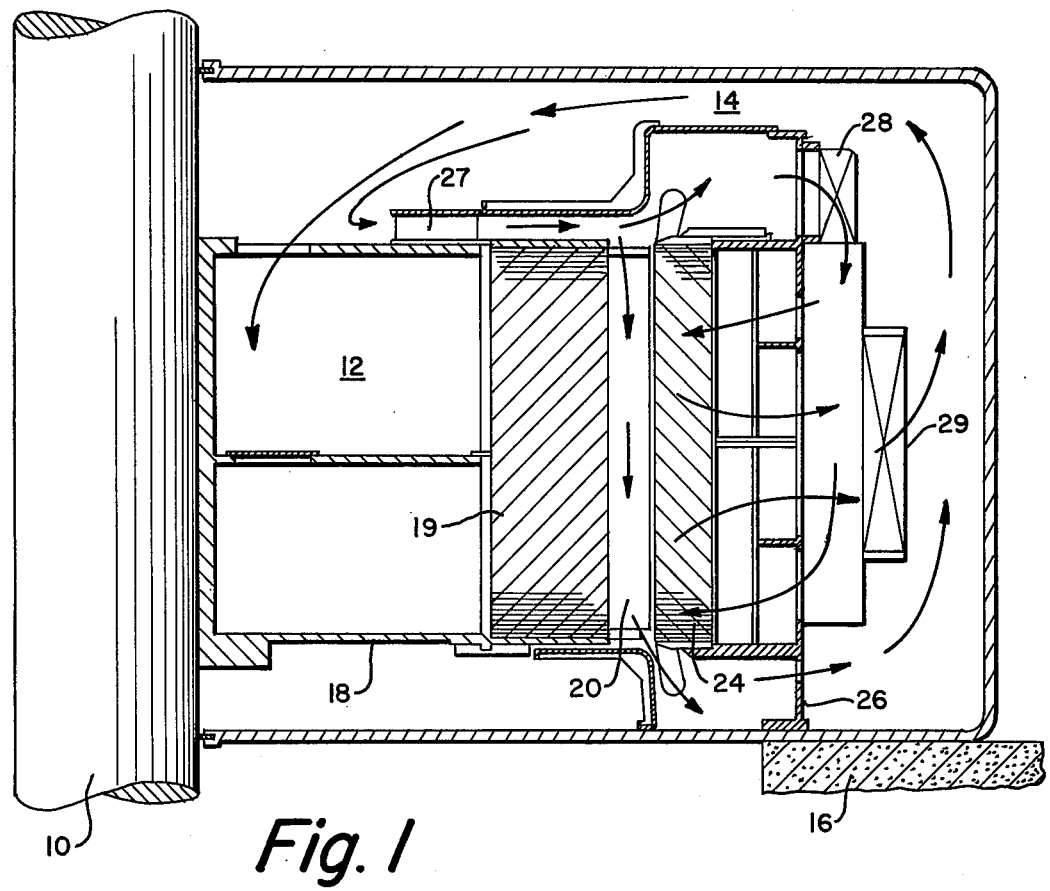
FIG. 1 is a vertical sectional view of a large dynamoelectric machine embodying the invention.

The invention is shown in the drawings embodied in a large, vertical hydro machine suitable for use as a water-wheel driven generator or as a generator-motor for pumped storage power projects. The machine has a vertical shaft 10 carrying a rotor member 12 for cooperation with a stator 14 which is supported on a foundation 16 of any suitable type. The shaft 10 and rotor 12 are supported on a thrust bearing (not shown) of usual type and the overall construction of the machine may be of any usual or desired type.

Figure 2:
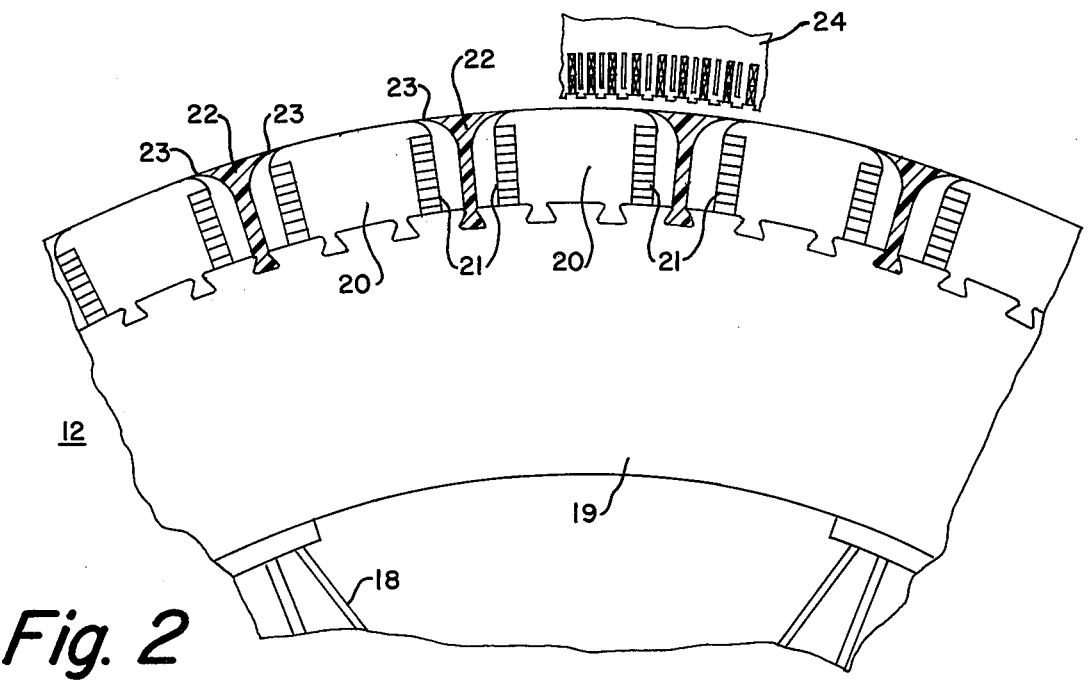
FIG. 2 is a fragmentary plan view of the rotor and stator of the machine of FIG. 1.

The rotor 12 consists of a spider portion 18 mounted on the shaft 10 and which may be of any suitable or usual construction. A laminated rim 19 is carried on the spider portion 18 and salient poles 20 carrying field windings 21 are mounted in the usual manner on the rim 19. The rotor 12 may be of any suitable construction and is cooled by its own ventilation system separate from that of the stator, the rotor air flow being sealed off from the air gap between the rotor and stator, as discussed above. For the purpose of illustration, the rotor 12 is shown as being of a type disclosed in the above-mentioned Kilgore et al. patent. As shown in FIG. 2, partitions 22 extend axially through each of the interpolar spaces and have flanges 23 which engage the adjacent pole faces to seal the interpolar spaces from the air gap. The rotor is cooled by air flowing through the spider and flowing axially through the interpolar spaces, as indicated by the arrows in FIG. 1, and as more fully described in the above-mentioned patent.

The stator 14 comprises a laminated stator core 24 supported between end plates 25 in a frame 26 of any suitable construction supported on the foundation 16. The stator core 24 is of the usual laminated construction providing spaced radial vent ducts, as more fully described hereinafter, through which air may flow radially of the core. Ventilating air may be circulated through the machine by any desired means which is shown as a centrifugal blower consisting of a plurality of blades 27 mounted on the rotor. Air flows from the blower in the paths indicated by the arrows and through coolers 28 which may be of usual type, any necessary number of such coolers being provided about the circumference of the machine. The air flowing through the coolers is directed into suitable ducts for passage through the stator core 24 and, upon discharge from the stator core, is directed through coolers 29 and discharged for recirculation by the blower and by the rotor 12. It will be understood that any suitable type of blower may be used mounted on the rotor as shown, or the necessary number of externally mounted blowers might be used to circulate the air in any desired path through coolers and the necessary ducts to and from the stator core.

Figure 4:
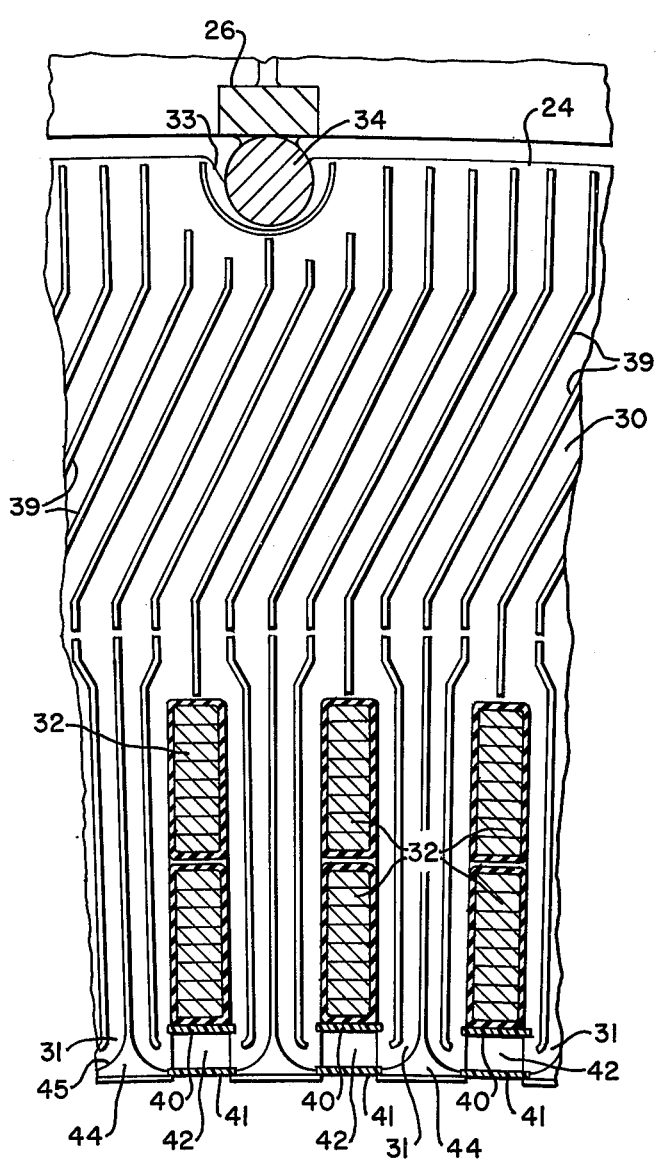
FIG. 4 is a fragmentary plan view of a portion of the stator core.
Figure 3:
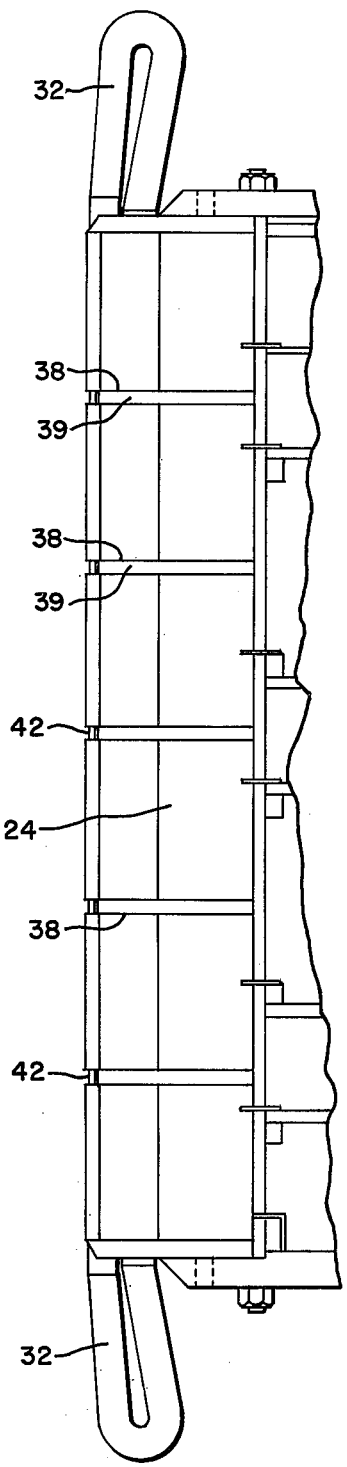
FIG. 3 is an enlarged vertical sectional view of the stator core of the machine.

As shown more particularly in FIGS. 3 and 4, the stator core 24 is of laminated construction and is built up of the usual punchings 30 to form a cylindrical core having a central bore therethrough with teeth 31 extending longitudinally of the bore to form slots between them for the reception of stator windings 32. The stator punchings 30 may be of usual type having recesses 33 at the outer periphery for reception of building bolts 34 on which the core is supported in the frame 26. If desired openings might be provided in the punchings to form axial ducts through the core for passage of ventilating air in the usual manner. The stator core 24 is provided with a plurality of longitudinally spaced radial vent ducts 38 extending radially through the core from the central bore to the outer periphery. The vent ducts 38 are provided by attaching spacing fingers 39 to certain of the punchings 30 at the desired intervals in the core to space the adjacent punchings apart and thus form radial ducts 38.

The stator windings 32, which may be of any usual type, are received in the winding slots formed by the teeth 31. In accordance with the invention, the slots are made deeper than is necessary to accommodate the windings so that a space remains at the top of each slot. A wedge 40 which may be of usual type is inserted in each slot engaging the winding to retain it in place. A second wedge 41 is inserted at the top of the slot (i.e., the radially inner end) so that it is radially spaced from the first wedge and the two wedges define or enclose a duct space 42 extending longitudinally throughout the length of the slot. The two wedges may be of usual material and design but the second wedge 41 is made to fit in the slot with a sealing engagement so that the ducts 42 are sealed from the air gap throughout their length. The ducts 42 intersect the radial vent ducts 38 and thus communicate with them. The vent ducts 38 are closed and sealed at their inner ends by sealing members 44 which fit into the ducts between the tooth tips and seal the ducts from the air gap. The sealing members preferably have curved surfaces 45 as shown to facilitate air flow between the radial and longitudinal ducts.

Figure 5:
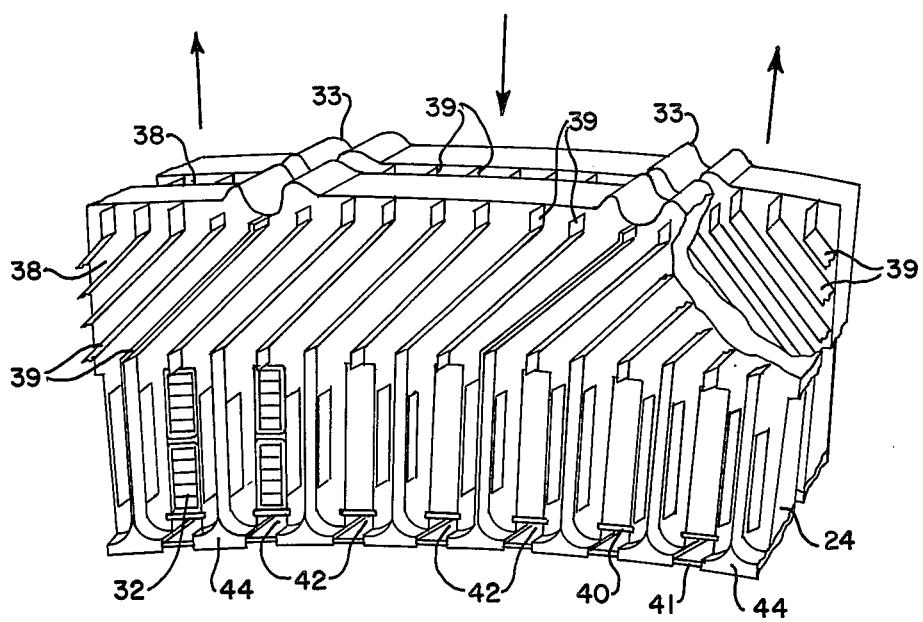
FIG. 5 is a somewhat diagrammatic perspective view of a portion of the stator core showing the air flow through the ducts of the core.

Cooling air directed from the coolers 28 to the core, as previously described, flows radially inward of the core through portions of the radial vent ducts 38, then longitudinally through the ducts 42 from one vent duct to the next, and radially outward through other portions of the vent ducts to be discharged and recirculated. The preferred flow path of the air through the stator core is shown more particularly in FIGS. 5 and 6 although it will be understood that other flow paths might be used. As there shown, each vent duct 38 is divided into a plurality of circumferential zones, corresponding in extent to the spaces between adjacent building bolts 34, which are alternatively inlet zones and discharge zones for the cooling air as indicated by the arrows in FIG. 5. In order to accomplish the desired air flow in the ducts, the spacers 39 are radial in the tooth portions of the core and are bent to extend at an acute angle to the radial direction through the rest of the core. The spacers 39 of adjacent vent ducts are inclined in opposite directions with respect to the radial as can be seen in FIG. 5. Cold air is introduced into alternate zones of the radial vent ducts and discharged through the intervening zones, as indicated by the arrows in FIG. 5. Any suitable arrangement of ducts may be used for this purpose to direct the discharged heated air to the blower and coolers and the cold air into the core.

Figure 6:
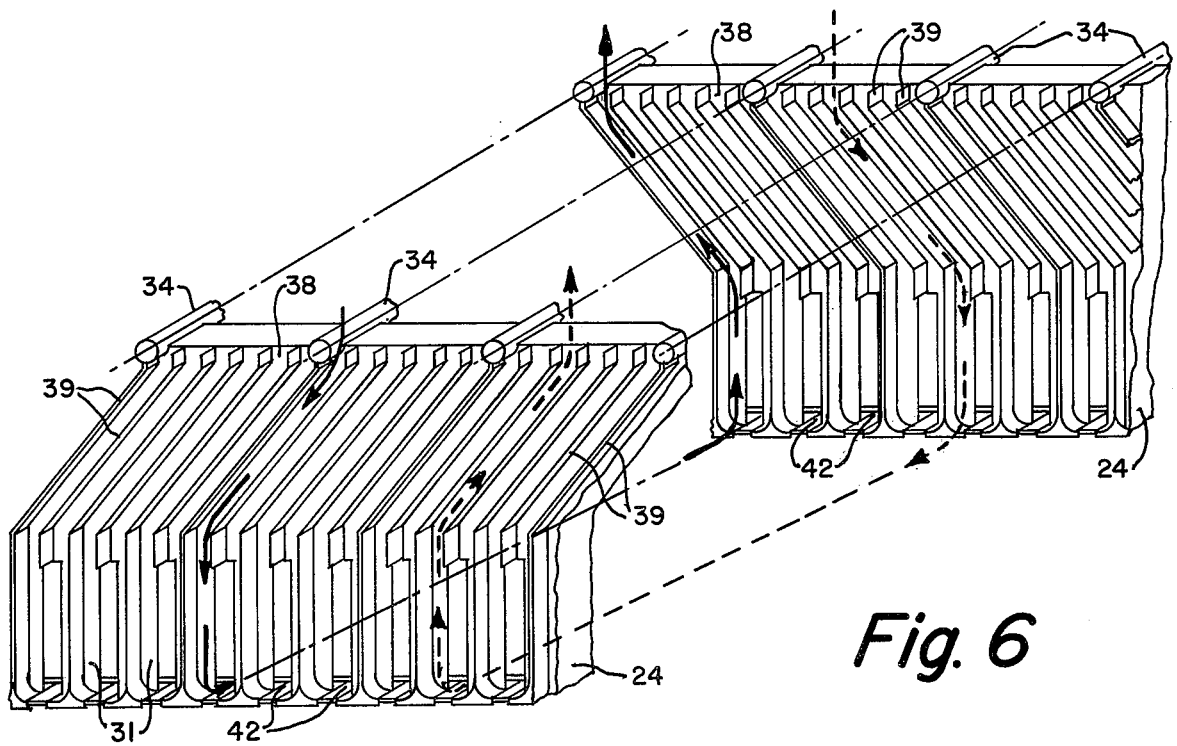
FIG. 6 is a diagrammatic perspective view further illustrating the air flow of FIG. 5.

The air flow paths in the stator core resulting from the above-described arrangement are shown diagrammatically in FIG. 6 in which one flow path is shown by solid arrows and another flow path is shown by dotted arrows, three of the circumferential zones being shown. Thus, air entering the front or forward duct 38 of FIG. 6 in the center zone (solid arrows) is shifted to the left by the inclined spacers 39 and flows to the teeth where it enters the longitudinal ducts 42. The air flows in both directions through these ducts, the rearward flow being shown. When the air reaches the next adjacent (rearward) vent duct 38, it meets oppositely flowing air and both streams flow radially outward into the vent duct. Since the spacers 39 in this duct are oppositely inclined, they shift the air farther to the left and it is discharged through the left-hand circumferential zone of FIG. 6. The path of air entering the rearward vent duct in the center zone is shown by the dotted arrows. This air flows oppositely to the previously-described air flow and is shifted to the right by the inclined spacers 39 to discharge from the forward vent duct through the right-hand zone.

It will be seen that the stator core and windings are cooled by air flowing in a path which is sealed from the air gap and separate from the rotor cooling air path. Cool air flows radially inward from the back of the core, longitudinally through ducts in the slots closely adjacent the windings where the greatest amount of heat is generated, and radially outward to be discharged through the back of the core. The length of each longitudinal duct between adjacent radial ducts is relatively short and the air flows through the core in many short paths in parallel. This results in a relatively small pressure drop across the core so that the fan pressure difference required is relatively low. Since the air is cold as it enters the stator core and is required to absorb only the heat generated in the stator, a much smaller volume of air is required than was necessary in previous ventilation systems in which air flowed first through the rotor and then across the air gap into the stator so that the air was first heated by the rotor. The small volume of air required, together with the relatively low pressure drop across the core ducts, results in a great reduction in the pumping power required to circulate air through the machine as compared to conventional cooling systems, with a corresponding increase in efficiency, while the improved cooling permits an increase in rating of the machine or a decrease in size.

It will now be apparent that a greatly improved cooling system has been provided for salient pole machines in which separate cooling systems are provided for the stator and rotor. The new stator cooling system disclosed herein results in a very marked improvement in the stator cooling, and a reduction in the pumping power required, with a substantial improvement in efficiency. It will be understood, of course, that various modifications and embodiments of the invention are possible. Thus, other flow paths through the stator core might be utilized and the external air circuit outside the core may be arranged in any desired or suitable manner to cool and recirculate the air.

What is claimed is:

1. A dynamoelectric machine having a stator member and a rotor member separated by an air gap, said rotor member having salient poles and a ventilation system sealed off from the air gap, said stator member including a cylindrical stator core having a central bore with teeth extending longitudinally of said bore to form slots, a plurality of longitudinally spaced vent ducts extending radially through the core, stator windings disposed in said slots, means including two radially spaced members extending through each of the slots for defining longitudinal ducts extending through the slots adjacent the air gap and communicating with said radial vent ducts, means for sealing said longitudinal ducts and radial vent ducts from the air gap, and means for causing ventilating gaseous fluid to flow radially in said vent ducts and longitudinally in said longitudinal ducts from one vent duct to the next.

2. A dynamoelectric machine as defined in claim 1 in which said slots are of greater radial depth than said windings, and said longitudinal ducts extend through the slots in the spaces above the windings.

3. A dynamoelectric machine as defined in claim 2 wherein said gaseous fluid is air and said two radially spaced members comprise a first wedge in each slot engaging the winding therein to retain the winding in position, and a second wedge in each slot radially spaced toward the air gap from the first wedge and providing a substantially air-tight seal with the stator core, the spaces between the first and second wedges in each slot forming said longitudinal ducts.

4. A dynamoelectric machine as defined in claim 3 including additional sealing means for sealing each of said vent ducts from the air gap.

5. A dynamoelectric machine as defined in claim 3 including means in said vent ducts for directing air flow, said directing means including members in each vent duct extending radially of each tooth to the inner periphery of the core, each of said members terminating in a sealing portion engaging the core with a substantially air-tight seal and having surfaces adapted to direct air flow between the vent duct and the adjacent longitudinal ducts.

6. A dynamoelectric machine as defined in claim 3 in which said stator core is a laminated core, certain of the laminations of the core having spacing means thereon forming said radial vent ducts, said spacing means comprising a plurality of members in each vent duct disposed to direct air flow in the vent ducts and between the vent ducts and the longitudinal ducts.

7. A dynamoelectric machine as defined in claim 6 in which said air directing members in each vent duct include members extending radially of each tooth to the inner periphery of the core, each of said last-mentioned members terminating in an enlarged portion engaging the core to form a substantially air-tight seal and having surfaces adapted to direct air flow between the vent duct and the adjacent longitudinal ducts.

* * * * *